W. B. PENNY.
SAW FILING MACHINE.
APPLICATION FILED OCT. 4, 1919.
1,376,634.
Patented May 3, 1921.
4 SHEETS—SHEET 2.
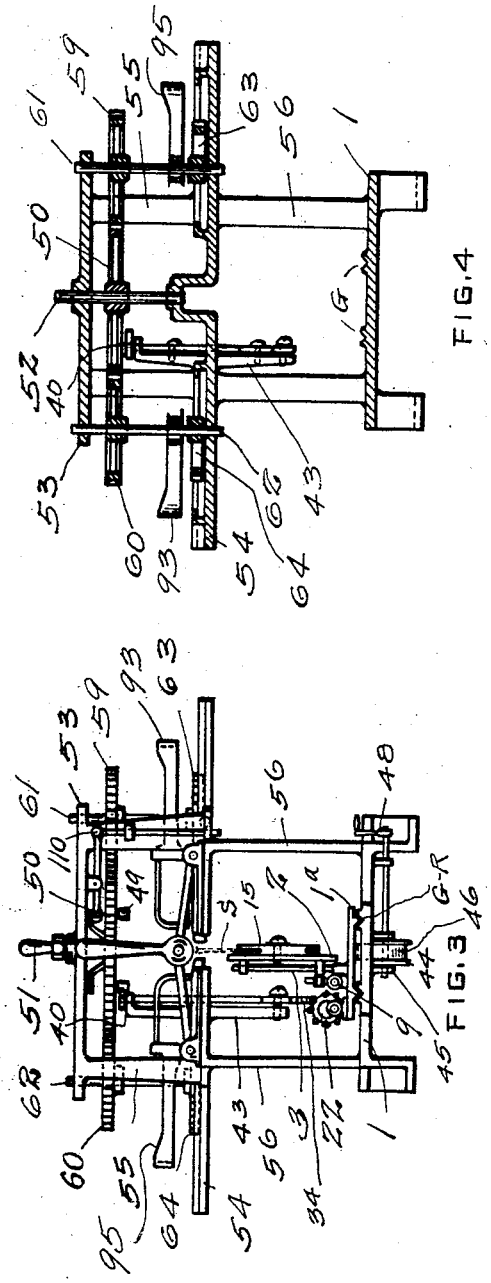
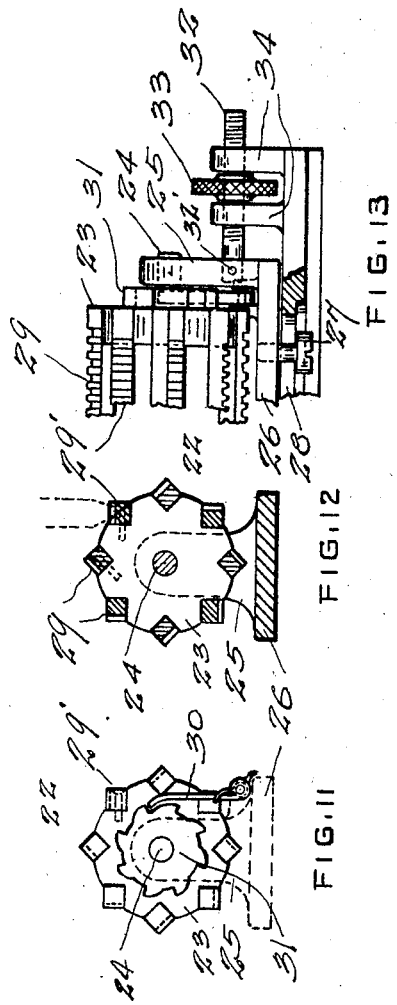
INVENTOR.
WALTER B. PENNY
BY
Shigley & Harney
ATTORNEYS

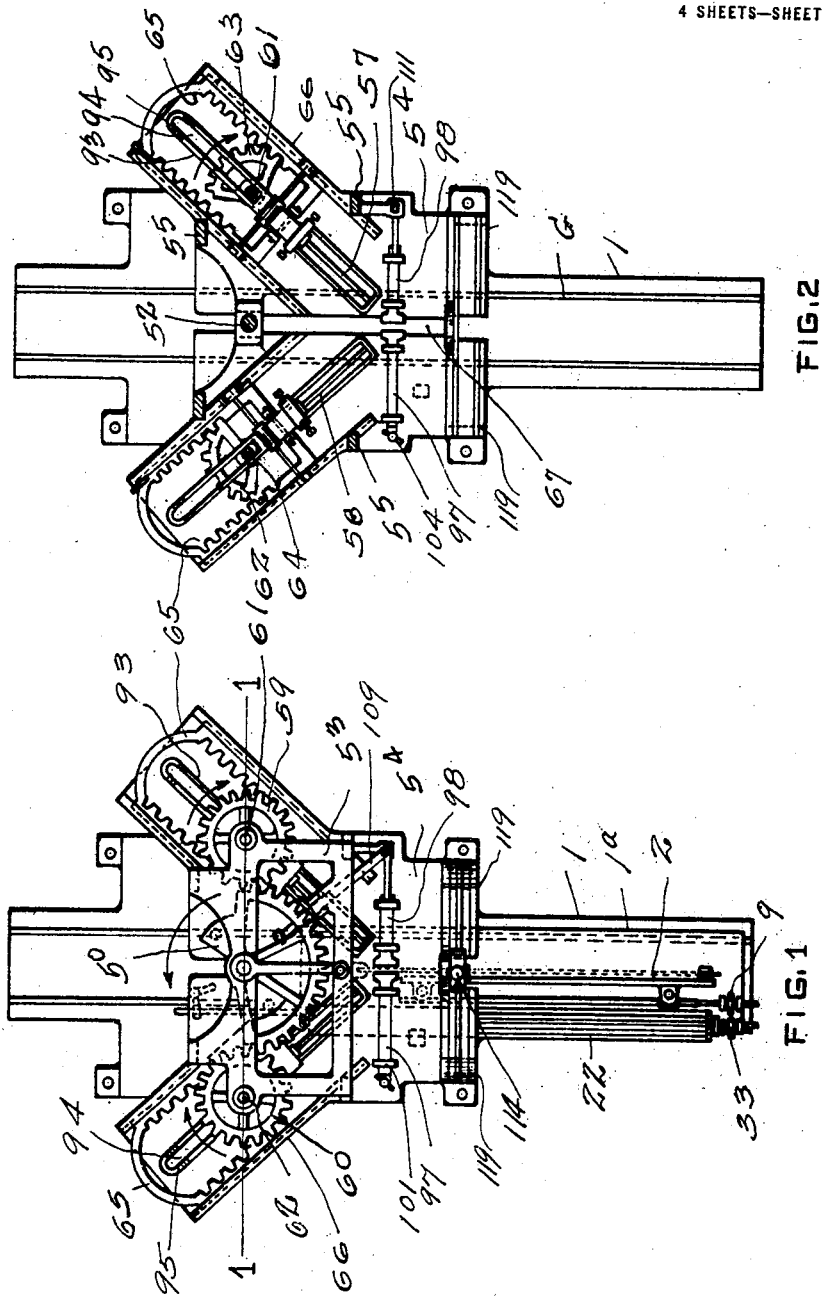

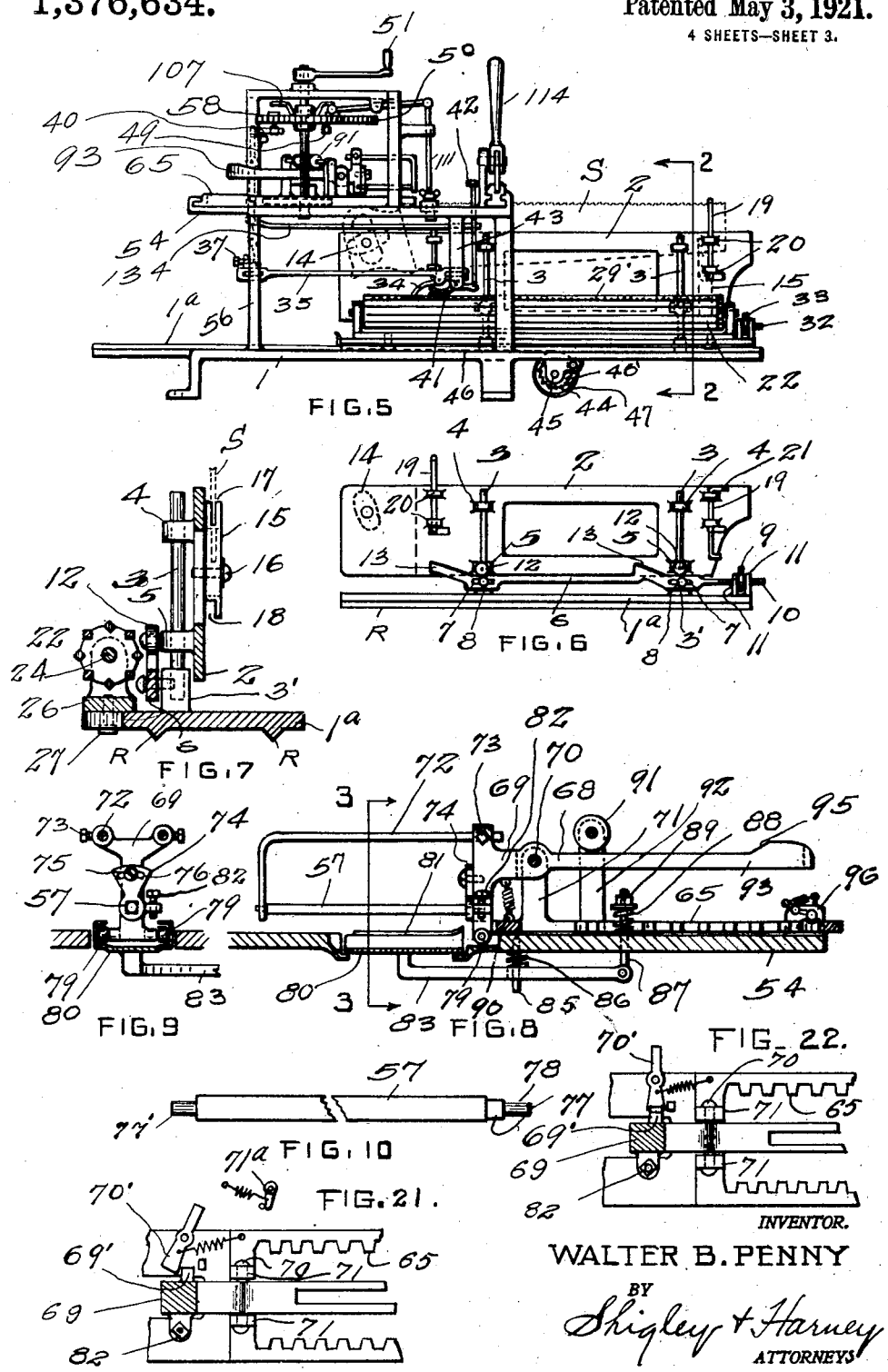

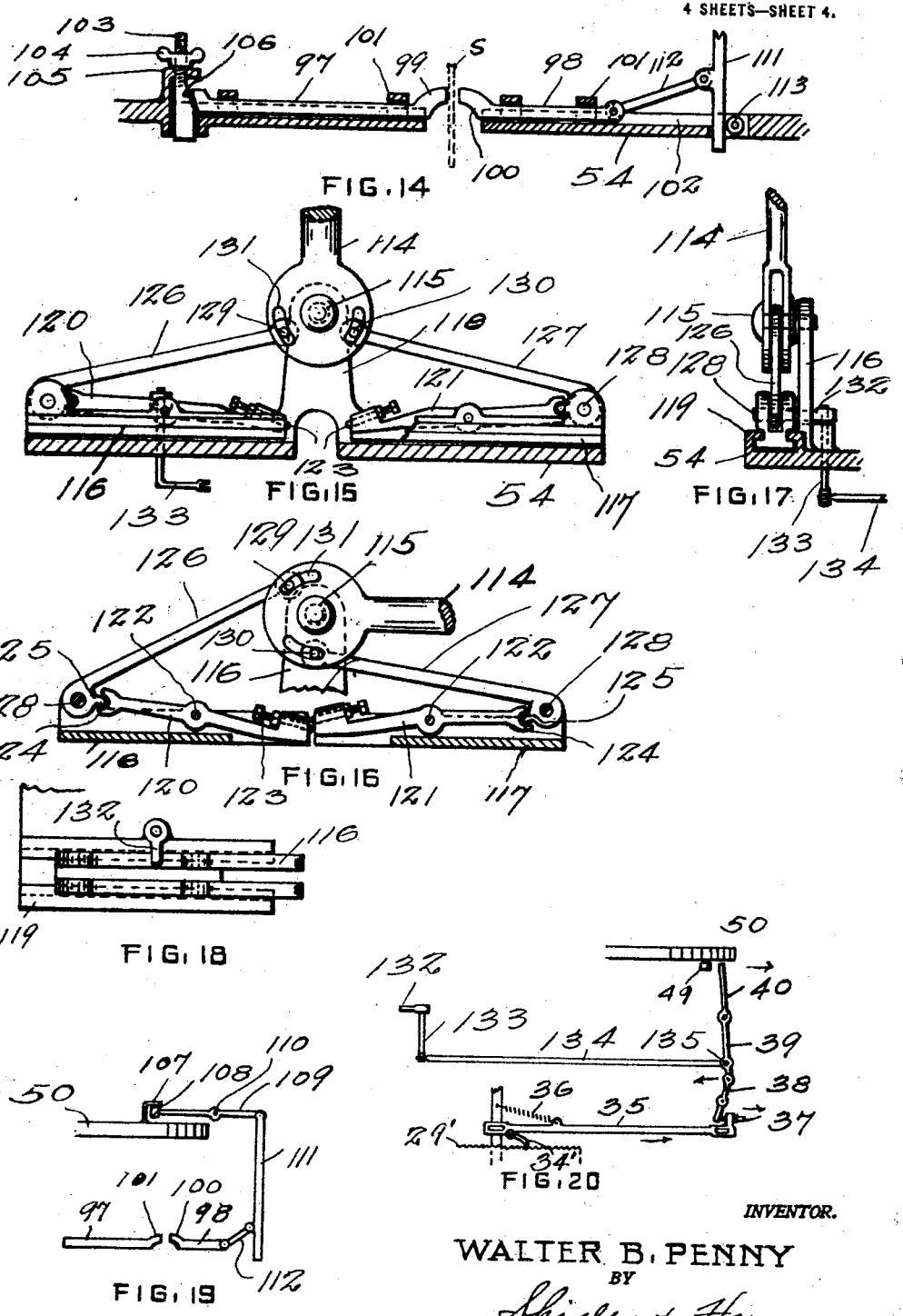

UNITED STATES PATENT OFFICE.

WALTER B. PENNY, OF COLUMBUS, OHIO.

SAW-FILING MACHINE.

1,376,634.  Specification of Letters Patent.  Patented May 3, 1921.

Application filed October 4, 1919. Serial No. 328,366.

*To all whom it may concern:*

Be it known that I, WALTER B. PENNY, a citizen of the United States of America, residing at Columbus, in the county of Franklin and State of Ohio, have invented certain new and useful Improvements in Saw-Filing Machines, of which the following is a specification.

My present invention relates to improvements in saw filing machines designed particularly for sharpening the teeth of hand saws, and while the machine is illustrated in the drawings and described as a hand operated device, it will be apparent that power may be substituted for manual labor and the device operated mechanically.

The primary object of the invention is the provision of a machine for sharpening and truing the teeth of the saw and also for setting or swaging the teeth, after they have been sharpened, which machine is simple in construction and operation, durable, and designed for use with various sizes of saws or saw-teeth.

To this end the invention involves a specially designed and operated saw carriage and holder by which the saw to be sharpened is advanced step by step or intermittently, to present successive teeth to a pair of files that are operated in synchronism with the saw feed, and these files, which work on transverse lines, or at an angle to the longitudinally disposed saw, are designed to contact with the saw teeth only on their outward or working stroke of their reciprocating movement. The longitudinal movement of the saw and the reciprocating movement of the pair of files are both accomplished from the rotary movement of the driving devices, and the invention consists essentially in the means for accomplishing these movements, together with certain novel combinations and arrangements of parts for adjusting and actuating the several devices combined herewith as will be described.

In the accompanying drawings one complete example of the physical embodiment of my invention is illustrated, the parts being combined and arranged according to the best mode so far devised for the practical application of the principles of the invention.

Figure 1 is a plan view of the complete machine.

Fig. 2 is a plan view with the upper structure of the machine omitted.

Fig. 3 is a front end elevation, and Fig. 4 is a complementary, vertical section, at line 1—1 of Fig. 1.

Fig. 5 is a side elevation viewed from the left in Fig. 1.

Fig. 6 is a side elevation of the saw carriage, detached.

Fig. 7 is an enlarged sectional view of the carriage on line 2—2 of Fig. 5, and Fig. 8 is a detail side elevation, partly in section of one of the two file carriers.

Fig. 9 is a cross section on line 3—3 Fig. 8. Fig 10 is a side view of one of the two files used.

Figs. 11, 12 and 13 are respectively an end elevation, a transverse section, and a detail view of one end of the saw feed rack. Fig. 14 is a detail view of the saw vise.

Fig. 15 is a sectional detail of the saw swaging device, and Fig. 16 shows the same parts in different positions.

Fig. 17 is an end view of the saw swaging device, and Fig. 18 is a fragmentary top plan view thereof.

Figs. 19 and 20 are respectively diagrammatic views of the saw vise actuator and the saw carriage feed mechanism, the latter also showing a connection from the saw swage.

Figs. 21 and 22 are details of the file carrier.

In the preferred form of the invention illustrated in the drawings, the machine is supported on the foundation or base plate 1 of metal, fashioned with usual attaching devices to be secured to a table or bench, and upon the base plate the slide plate 1ᵃ of the saw carriage 2 is adapted to reciprocate, sliding in the parallel grooves G in the upper face of the base plate and guided by the ribs or tongues R at the underside of the slide plate. The saw carriage is designed to support the saw while being filed or set and is movable, step by step, as the saw S is sharpened and the successive teeth are filed, and for this purpose the vertical plate 2 of the saw carriage, is adjustable on the two posts 3, 3, spaced apart and rising from the slide plate 1ᵃ in which they are fixed as by insertion in the bosses 3' integral with the slide plate. At one side the vertical plate of the carriage is provided with a pair of upper, perforated lugs 4 and complementary ears 5, fitting over the post 3, 3, with a neat close fit in order that the plate may be elevated for adjustment by action of the cam bar 6. This bar is located just above the slide plate and is movable longitudinally thereof by reason of its spaced slots 7 7 and the pins 8, 8, the latter being fixed in the bosses 3' of the slide plate, this support being such that the bar may be moved longitudinally when the thumb nut 9 which is threaded on the threaded end 10 of the bar, is turned between the two lugs 11 rising from the slide plate. On each lower lug or ear 5 is supported a roller 12 against which the two inclined or cam faces 13 of the cam bar 6 are designed to contact, and it will readily be apparent that when the thumb nut 9 is turned clockwise the bar will be pulled to the right in Fig. 6 causing the cam faces to contact with the anti-friction rollers 12 with the result that the vertical plate or saw-holder 2 is steadily and uniformly elevated to lift the saw S, and a reverse movement of the nut permits the saw holder to be depressed.

The saw S is directly supported on the saw holder 2 through the instrumentality of a turn button 14 which is designed to frictionally engage the slotted handle of the saw, as in Fig. 5, to support one end, and at the other end the saw blade is supported on a reversible and adjustable block 15 pivoted at 16 on the saw-holder plate and provided at opposite ends with a groove or kerf 17 to receive and retain saw blades of ordinary thickness, and with a second recess 18 to accommodate blades of greater thickness.

After the saw is placed in its two supporting members on the saw holder or upright plate 2, a pair of gage pins 19, rotatable, and slidable in the bearing brackets 20 on the saw holder, and each fashioned with bent ends 21, are used to position the saw blade, or its toothed edge, in horizontal position while the saw is being clamped to its holder. In Fig. 6 one of the pins is in operative position and the other in inoperative position, while in Fig. 5 both pins are in operative position, each with its upper bent end over the toothed edge of the saw. After the saw is fixed in proper position these pins are dropped down out of the way, as at the right end of the saw holder in Fig. 6. If and when it becomes necessary to elevate or depress the saw as the filing process progresses, the thumb nut 9 is utilized as described.

The saw carriage and saw, are moved rearwardly, i. e. to the left in Fig. 5, step by step, as the filing of the saw proceeds in order that successive teeth of the saw may be presented to the files, and to accomplish this movement or feed I utilize a toothed rack in the form of a skeleton cylinder or drum indicated as a whole by the numeral 22. This device comprises a pair of disk heads 23 with trunnions 24 journaled in the upright brackets 25 of the connecting plate 26 secured by screws 27 that pass upwardly through slots 28 from the bottom of the slide plate 1ª (see particularly Fig. 13). Between the disk heads are extended eight bars 29, each having on one face rack teeth, but the pitch or gage of the teeth differs in order that the eight bars will be adapted for use with eight different saws having teeth of these different pitches. Thus when a saw with teeth of a certain pitch is to be sharpened or filed, the rack bar with complementary teeth is selected, and turned to position 29' in Figs. 11 and 12, being there held by spring pawl 30 engaging ratchet 31 on one of the trunnions of the rack drum 22. The approximate longitudinal adjustment of the rack drum may be accomplished by the screws 27 in slots 28, but close and accurate adjustment is attained through the instrumentality of the screw bolt 32 pivoted or loosely jointed to the bracket 25 at 32' (see Fig. 13) and by means of the thumb nut 33 between the lugs 34 integral with the slide plate 1ª a nice adjustment can be secured for the files on the teeth of the saw, or for timing with the saw setting device.

For convenience of illustration and clarity of understanding I have shown in Fig. 20 a diagram of the mechanism for imparting the step by step feed to the saw carriage in its relation to the active rack bar 29' of the rack 22. Here it will be seen that a pawl 34' is carried by the draw bar 35 and engages the rack 29', the bar being reciprocated against the tension of the spring 36 that is fastened to the draw bar and to a fixed part of the machine frame, and the longitudinal reciprocation of the bar is guided by the slotted construction thereof. At one end of the draw bar a tappet 37 is provided constituted by a bolt or screw that is of course adjustable and may be turned to adjust the contact between the tappet and the pivoted link 39 that is pivotally connected with and oscillated by the lever 40, the arrows in this view showing the movement of the parts on the working stroke of the mechanism as the saw carriage is advanced in its feed movement.

In Fig. 5 a release pawl 41 is shown in contact with the feed pawl 34, and it will be apparent that by pushing down on the push rod 42, the pawl 41, which is pivoted in the fixed bracket 43, will lift the feed pawl from engagement with the rack teeth, and the saw carriage is then returned to forward position by the spring drum 44.

The return drum 44 is journaled in brackets 45 beneath the base plate 1 which is slotted for the accommodation of the drum, and a metal tape or chain 46 wound on the drum is attached thereto and also connected with the slide plate of the saw carriage through the slotted base plate, The spring of the drum, not shown, is held by the pawl 46' and ratchet wheel 47 (Fig. 5) and the spring may be wound by using the crank handle 48 (Fig. 3) extending out at the right of the base plate of the machine.

The saw-carriage feed-mechanism (Fig. 20) is actuated by a pair of antifriction rollers 49 on the underside of the main drive wheel 50, which rollers, as the wheel is revolved alternately contact with the oscillatable lever 40 to impart movement to the train of mechanism already described, one revolution of the wheel imparting two strokes to the mechanism as understood.

The main wheel 50, which is rotated anticlockwise by the hand crank 51 (Figs. 1 and 5) is an interrupted gear wheel with its teeth occupying a segment of 180° and is fast on the drive shaft 52 standing vertically in the longitudinal axis of the machine and supported between the upper and lower frame plates 53 and 54 of the machine that are in turn supported by the rigid posts 55 and 56, forming with the base plate, a rigid and integral cast frame for the support of the operating parts of the saw filing machine. The cast frame is a superstructure located above the main frame or base plate and supports the pair of intersecting, reciprocating, files 57 and 58 which operate transversely of the saw at about an angle of 45° to the saw and about 90° to each other.

The files operate on the saw only on their outward or forward strokes as they reciprocate alternately across the saw, and the action of the saws is accomplished from the main segment gear wheel 50 which alternately meshes with the full gear wheels 59 and 60 on their respective shafts 61 and 62 spaced equidistant and laterally from the main drive shaft 52 and supported in the plates 53—54 of the frame. At the lower end of these countershafts another pair of segment gears 63 and 64 are provided and these gears are designed to impart reciprocating motion to the two double rack frames 65 which are duplicates, located at opposite sides of the longitudinal center of the machine and slidable in the flanged brackets or ways 66 which diverge at the sides of the lower frame plate 54, which, it will be observed in Fig. 2 has an open slot 67 extending longitudinally thereof for the saw to be filed. It will now be apparent that the continuous rotation of the driving segment 50, through the rotary movement of the full gears and segmental gears, is converted into reciprocatory movement of the rack frames, which are actuated-alternately to impart a forward working stroke to the files carried and supported by these rack frames with their internal gear or rack teeth engaged by the segments 63 and 64.

The files work only on their advance or forward stroke, and are elevated and held in inoperative position free from the saw on their return strokes by the action of the oscillatable frame 68, (Fig. 8) and inasmuch as both frames are alike the description of one will suffice for both, it being understood that each reciprocating file carrier or rack frame 65 has one of these oscillatable frames.

Each frame 68 is fashioned with a head 69 pivoted at 70 in the brackets 71 integral with and rising from the sides of the rack frames or carriers 65, and a file holder 72 made up of parallel bars is adjustably held in the head by means of the set screws or bolts 73. In Fig. 10 one of the files is illustrated and it is supported between the holder 72 of the head and the adjustable sector 74 attached to the head by a screw 75 and fashioned with a curved slot 76, through which sector the squared portion or shoulder 77 of the file passes and the trunnion 78 fits into the socket therefore in the head. The file is directly supported by its trunnions 77' and 78 in the holder and head respectively, but it will readily be seen that the file may be turned on these trunnions as a center by loosening the screw 75 and swinging the sector 74 to the right or left in order to present the working face of the file at the desired or proper angle to the saw teeth.

The oscillatable frame is carried forward, bodily, by the reciprocating file carrier, and it will be observed that at the sides of the head 69, at the lower end, a pair of lateral rollers 79 are journaled which are designed to roll over the flat plate 80 that is fashioned with inturned or overhanging flanges 81 beneath which the rollers pass on their outward movement and in close contact therewith, a set screw 82 being provided on the head 69 to adjust the position of these rollers in reference or relation to the inclosed track formed by the flanged plate 80. The function of the flanges 81 is to hold the file down to its work on the tooth of the saw as the former passes over the latter, and for this purpose the flanges coöperate with the rollers to secure this pressure. A slight or heavy pressure may be produced by adjusting the pressure plate 80 which has an arm 83 extending back under the plate 54 to which it is secured on the fulcrum pin 85 that is cushioned by the spring 86 interposed between the pivot arm and the stationary part of the frame. The free end of the arm 83 has a pivoted screw bar 87 passing upwardly through the stationary frame and a cushion spring, under compression indicated at 88 is interposed between the nut 89 on the screw bar and the frame plate 54 through which the screw bar passes. Now it will be apparent that when the nut 89 is turned to the right the flanges 81 will be made to bear with greater pressure on the rollers, and when turned to the left the spring 88 will be relieved and the rollers may be passed under the flanges with a more resilient action and less pressure of the file on the saw teeth. A spring 90 supported between the head 69 just at the side of the pivot 70, and the file carrier rack, tends to hold the head down so that the rollers will enter and pass under the flanges.

On the outward or working stroke of the file the rollers pass under the flanges, and at this point the frame is oscillated so that the head 69 swings upwardly to free the rollers from and beyond the outer ends of the flanges 81, and to free the file from the saw tooth, so that the file does not engage the tooth on its return stroke. The lifting of the file holder and head is accomplished by the cam roller 91 journaled in stationary brackets 92 rising from the plate 54 under which roller the arm 93 rides as the file carrier frame reciprocates. The arm is provided with a vertical slot 94 to accommodate the shafts 61 or 62, and at its rear free end the arm is fashioned with an upwardly inclined cam face 95 which rides up beneath the roller 91, when the file holder has reached its forward limit of stroke, thus lifting the file holder and head in order that the rollers 79 may return and roll over the top of the flanges 81 of the plate 80. The spring 90 holds the file holder and oscillating parts stable and prevents loose movement, and a spring lever or detent 96 at the extremity of the frame plate 54 holds the slidable rack frame snugly in place to prevent rattle, or jarring to incorrect position.

At the working point of contact of the file with the saw the latter is held in a clamp or vise, as best seen in Fig. 14, to maintain the saw rigidly and secure proper action of the file. The vise embodies two slide bars 97 and 98, located transversely of the saw and provided with complementary jaws 99 and 100 and retained in position by the guide plates 101 which extend transversely over the grooves 102 in the plate 54 in which these bars are seated. The jaw 99 is a relatively stationary member, but may be adjusted in its position at one side of the saw by means of the cam bolt 103 and nut 104, the bolt being retained in bracket 105 and provided with a cam face 106 to engage a complementary face at the outer end of the bar 97. The jaw 100, however, is movable with relation to the jaw 99 and is actuated in synchronism with the saw feed mechanism (see Fig. 19) from the drive wheel 50 of the file machine. On the upper face of the drive wheel 50 are arranged two diametrically opposite cams 107 which successively actuate, by direct contact with anti-friction roller 108, the clamp lever 109, pivoted at 110, (Fig. 3) beneath the upper plate 53, and pivoted to the upper end of the vertically reciprocable arm 111 that is linked to the movable, horizontally arranged sliding jaw-bar 98, at 112. The action of the lever connection will be apparent and the clamp will engage the saw directly beneath the file each time a file passes over a tooth, which is twice to each revolution of the drive wheel, as is also the case with the feed mechanism for the saw. The reciprocable arm 111 passes through a slot in the plate 54 and may be provided with a guide roller 113 to facilitate the movement to straighten out the inclined link 112 to clamp the saw between the jaws 99 and 100, and the vise opens and closes twice during each revolution of the drive gear to permit feed of the saw carriage. The saw may be fed through the machine as often as is necessary to accomplish the proper sharpening, and the machine is automatic in its action after the saw has been clamped in its carriage, except that the reverse 42 is depressed to return the saw carriage at the end of each working travel of the carriage. The horizontal adjustment of the saw insures a uniform angle on the teeth and one tooth is not filed more than another, while the adjustment of the file permits filing the tooth at the proper angle.

In connection with the filing of the saw teeth, I use a hand operated saw-setting device which utilizes the saw carriage and its feed mechanism, but not the filing devices. In Figs. 15, 16, 17, 18, 20, specifically and in other figures of the drawing generally, the saw setting device is illustrated as operable, by means of the vertically arranged hand lever 114, on the plate 54. The lever is fulcrumed or pivoted at 115 in the bracket 116 of the plate 54, and is turned alternately from side to side on its pivot 115 to actuate the slide blocks 117 and 118 that move or reciprocate in the grooves formed by the flanges 119 on the plate 54 provided for the purpose. These slide blocks carry oscillatable punches or swaging devices 120 and 121, pivoted at 122 in their respective blocks and provided with contact points or set screws 123 for engagement with the saw teeth for bending them to the proper set, the punches engaging the same tooth, and thus enabling one punch to perform the fuction of an anvil for the other punch, in holding the parts rigid and withstanding the push employed to bend the tooth. The outer ends of these punches are bifurcated, forked, or recessed at 124 for engagement therewith of the actuating pawls 125 on the respective links 126 and 127 which are pivoted to their respective blocks 117 and 118 at 128, and at 129 and 130 these links have connecting pins operative in the slots 131 in the head or disk of the lever 114. To continue the description of the saw swage refer to Figs. 20 and 18 wherein the horizontal tappet arm 132 extends over the block 116 to be rocked thereby to swing the arm 133 and link 134 pivoted at 135 in a slotted hole to the lever arm 39 of the saw feed mechanism, and in this manner the saw is moved by its feed pawl 34' one tooth at a time as the swaging proceeds.

In Fig. 15 the swaging lever is in neutral position and the swaging punches are withdrawn. In Fig. 16 the lever 114 has been swung or rocked to the right with the result that the punches have been moved to position to bend the tooth to the right, the punch lever 121 acting as the anvil for the punch 120 with its point beneath the point of punch 121. The next tooth will be swaged to tne right and the initial movement of the block 116 will feed the saw one tooth with the result that when the lever 114 has been rocked to extreme left position the next tooth will be engaged between the punches with the punch 121 acting as the anvil for the punch 120. In this manner the successive teeth are swaged or bent uniformly and accurately, and the operation may be repeated, if desirable by releasing the carriage feed to return the saw carriage to original position for a successive intermittent feed through the machine. Thus the sharpening and setting of the saw may be accomplished without removal of the saw from the machine, with facility and despatch.

What I claim is—

1. The combination with the intermittently forwardly movable saw carriage, and automatic return mechanism therefor, of an angularly disposed reciprocable file, and means for jointly operating said carriage and file.

2. The combination with the reciprocable saw carriage, a forwardly intermittent feed mechanism therefor, and automatic return mechanism therefor of an angularly disposed reciprocable file, and rotary driving mechanism connected to jointly operate the file and carriage.

3. The combination in a saw filing machine with the forwardly intermittently moving saw carriage and automatic return mechanism therefor, of a pair of opposed, angularly disposed reciprocating files, and means for jointly operating the carriage and alternately actuating the files.

4. The combination with the reciprocable saw carriage and its forwardly intermittent feeding device and automatic return mechanism for the carriage, of an angularly disposed reciprocable file operating on its forward stroke with means for rendering inoperative the return stroke of the file, and means for jointly operating the carriage feed and the file.

5. The combination in a saw filing machine with the intermittently movable saw carriage and its saw holder comprising an adjustable, relatively stationary plate having means for securing the handle end of a saw thereto and an adjustable, grooved block on said plate to receive the other end of the saw blade, of an angularly disposed reciprocable file, and means for jointly and synchronously operating said carriage and file.

6. The combination in a saw filing machine with the intermittently, forwardly movable saw carriage and an openable holder for clamping the saw, of a pair of opposed, alternately operating, angularly disposed files, and means for jointly and synchronously operating said carriage and files.

7. The combination in a saw filing machine with the intermittently, forwardly movable saw carriage and an openable holder carried thereby for clamping the saw, of a pair of opposed, alternately operating, angularly disposed files working on their forward strokes, means for rendering the return strokes of the files inoperative, and means for jointly and synchronously operating the carriage and files.

8. In a saw filing machine, the combination with the reciprocable carrier of an oscillatable holder and file, of a cam wheel on the carrier and a cam arm on the holder whereby the file is rendered inoperative on its return stroke.

9. The combination with the reciprocable carrier of an oscillatable file holder and file, a relatively stationary adjustable pressure plate to guide the holder on its forward stroke, and coacting means on the carrier and holder for rendering inoperative the return stroke of the file.

10. The combination with the reciprocable carrier of an oscillatable file holder and file, an adjustable pressure plate with guide flanges to guide the holder on its forward stroke, a wheel on the carrier, and a cam arm on the holder whereby the file is rendered inoperative on its return stroke.

11. The combination in a file machine with the file holder and means for adjusting the angle of the working face of the file with relation to the holder.

12. The combination with the slide plate of the saw carriage having supporting posts, of a holder plate vertically adjustable above the slide plate and supported on posts, and a cam bar on the slide plate engaging rollers on the holder plate with means for moving said bar, as described.

13. The combination in a filing machine with a pair of diverging, reciprocating, double racked file carriers and a segment gear for each carrier, of a segmental driving gear, intermediate full gear wheels and a supporting shaft for the gears as described, whereby the rotary motion of the driving gear is converted into reciprocating motion of the carriers.

14. The combination in a saw filing machine of a file holder and file having end trunnions therein, an adjustable sector plate on the holder engaging the file and means co-acting with said plate whereby the file may be turned with its working face at a selected angle to the saw teeth.

15. The combination in a saw filing machine of a file holder and file having end trunnions therein, a slotted sector plate fixed on the file, and a set screw in the slotted plate threaded in the holder, whereby the file may be adjusted with relation to saw teeth.

16. The combination in a saw filing machine of a file holder, comprising a head and an L-shaped holder adjustable therein, a file having trunnions in said L-shaped holder and head, a slotted sector plate having a squared opening fixed on the file, and a set screw in the slotted plate threaded in the head, for the purpose described.

17. The combination in a saw filing machine with a reciprocating file holder and file, of guide rollers carried by the holder, a guide plate having upper flanges to retain the rollers for holding the file in operative position on its working stroke, and means for elevating the holder on its return stroke whereby the rollers will travel on top of said flanges.

18. The combination in a saw filing machine with a reciprocating file holder and file, of guide rollers carried by the holder, a vertically adjustable guide plate having upper guide flanges to hold down the rollers on the working stroke of the file, and means for elevating the holder on its return stroke whereby the rollers will travel on top of said flanges.

In testimony whereof I affix my signature.

WALTER B. PENNY.